*J. P. Grosvenor,*
*Circular Saw Mill.*
No. 96,224. Patented Oct. 26, 1869.
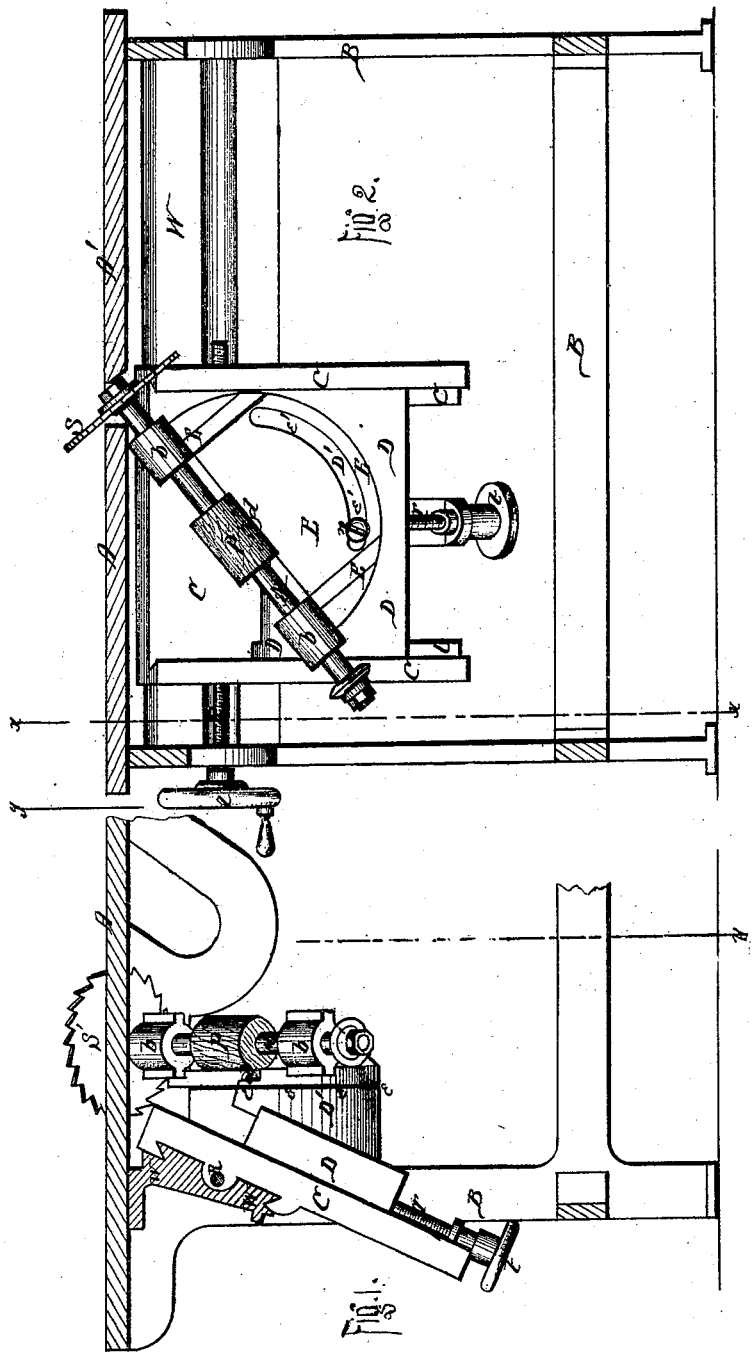
Witnesses:
Victor Hagmann
C. H. Pettit
Inventor:
J. P. Grosvenor
by Munn & Co.
Attorneys

# United States Patent Office.

J. P. GROSVENOR, OF LOWELL, MASSACHUSETTS.

Letters Patent No. 96,224, dated October 26, 1869.

---

IMPROVEMENT IN METHOD OF ADJUSTING CIRCULAR SAWS.

---

The Schedule referred to in these Letters Patent and making part of the same.

---

*To all whom it may concern:*

Be it known that I, J. P. GROSVENOR, of Lowell, in the county of Middlesex, and State of Massachusetts, have invented a new and improved Adjustable Circular Saw Mitring-Machine; and I do hereby declare that the following is a full, clear, and exact description of the construction and operation of the same, reference being had to the accompanying drawings, making a part of this specification, in which—

Figure 1 is a vertical section through line *x x* of fig. 2.

Figure 2 is a similar section through line *y y* of fig. 1.

The object of this invention is to obtain in mitring-machines, having a circular saw, a more simple, cheap, and perfectly-operating device for adjusting the saw, while keeping the belt taut at all times, and the table level and of uniform height.

The machine is an improvement upon those patented by me May 5, 1868, and September 15, 1868, respectively, the difference between the present and the former inventions consisting in the peculiar device for enabling the saw-mandrel, although hung in an inclined frame, to be oscillated in a vertical plane.

The same construction also enables me to raise or depress either end of the mandrel, and by changing the saw to one end or the other, its inclination can be adjusted at pleasure, in either direction.

In the drawings—

A A' indicate the platform of the saw-table, and B B, the supporting-frame.

C is an inclined frame, sliding longitudinally with the table, under the platform A A', being guided by horizontal ways or guides *w w*, and moved back and forth by a screw-rod, R, having a hand-wheel, *r*, on its outer end.

The under side of frame C is provided with guide-grooves or ways, and in them slides up and down a second frame, D, moved by another screw-rod, T, having a hand-wheel, *t*.

It will be observed that the inclination of frame C brings the hand-wheel *t* out to the side of the machine, a very convenient position for operating it.

The body of the sliding frame D is of uniform thickness, as shown in fig. 1, where its end appears in front elevation, but cast upon the back of this body is a semicircular projection, D', very thick at its lower and thin at its upper edge, its thickness being so proportioned to the inclination of the frame C that its face *e e e* is perfectly vertical.

On the vertical face thus formed is hung a semi-circular plate, E, having a curved slot, *e'*, near its lower edge, and pivoted at *d*, so as to swing endwise on its pivot, in a vertical plane.

In fig. 2, the face of the part D' is seen through the slot *e' e'*.

The swinging plate E is provided with bearings *b b*, near its ends, which support the saw-mandrel M.

S is one of the saws, and P is the belt-pulley.

From pulley P the driving-belt extends downward and back to the lower rear edge of the saw-table, where it is driven by a shaft or countershaft.

The saw works in an open space between the two parts A A' of the table, or in a suitable slot, provided for the purpose.

When preferred, however, the saw may work at the edge of the table.

*n* is a set-screw, by which the swinging plate E can be fixed at any inclination on the frame D D'.

The inclination of the frames C D is such that they are brought at right angles to the driving-belt, which must, of necessity, extend in a downward and backward direction from the pulley, any other direction causing it to interfere with the action of the machine in some respect.

The up-and-down adjustment of the frame D, therefore, slackens or tautens the belt so imperceptibly as not to impair its action in the slightest degree.

At the same time, although the frame is inclined, and moves obliquely, yet the saw-mandrel oscillates in a vertical plane.

It will be observed, from what has been said, without further description, that the saws can be adjusted vertically and laterally, as desired, and at any bevel that may be necessary.

By duplicating the combination C D E M on the beam W, and putting a saw on each mandrel, the device would become an extension-saw, cutting both ends of the stick at once.

Almost any length could be sawed by arranging both saws on the outer ends of the mandrels, or both on the inner ends, or one on the outer and one on the inner end, &c.

Having thus described my invention,

What I claim as new, and desire to secure by Letters Patent, is as follows:

The described construction and combination of the swinging plate E, capable of being fixed by means of the slot *e' e'* and pin *n*, the plate D having the projection D', as described and shown, the mandrel M, the saw S, and the frames C D, all constructed and operating together in the manner and for the purpose herein set forth.

To the above specification of my invention, I have signed my hand, this 26th day of August, 1869.

J. P. GROSVENOR.

Witnesses:
J. N. MARSHALL,
D. HALL RICE.